(12) United States Patent
Hirose et al.

(10) Patent No.: US 8,783,721 B2
(45) Date of Patent: Jul. 22, 2014

(54) METALLIC HOLLOW COLUMNAR MEMBER

(75) Inventors: Satoshi Hirose, Tokyo (JP); Takashi Ariga, Tokyo (JP); Shigeru Yonemura, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 14/008,269

(22) PCT Filed: Mar. 30, 2012

(86) PCT No.: PCT/JP2012/058681
§ 371 (c)(1),
(2), (4) Date: Sep. 27, 2013

(87) PCT Pub. No.: WO2012/133822
PCT Pub. Date: Oct. 4, 2012

(65) Prior Publication Data
US 2014/0021709 A1 Jan. 23, 2014

(30) Foreign Application Priority Data

Mar. 30, 2011 (JP) ................................ 2011-074302

(51) Int. Cl.
*B62D 21/15* (2006.01)

(52) U.S. Cl.
USPC ...... 280/784; 296/187.03; 296/205; 188/377; 52/843

(58) Field of Classification Search
USPC ........ 280/784, 798, 796; 296/187.03, 187.05, 296/187.09, 187.12, 203.03, 203.02, 205; 188/371, 376, 377; 52/843
See application file for complete search history.

(56) References Cited

U.S. PATENT DOCUMENTS 1,656,810 A * 1/1928 Arnstein .................... 52/634

6,928,736 B2 * 8/2005 Czaplicki et al. ............ 29/897.2
(Continued)

FOREIGN PATENT DOCUMENTS

| JP | 8-108863 A | 4/1996 |
| JP | 2002-12165 A | 1/2002 |

(Continued)

OTHER PUBLICATIONS

International Search Report mailed on Jul. 3, 2012, issued in PCT/JP2012/058681.

*Primary Examiner* — Drew Brown
(74) *Attorney, Agent, or Firm* — Birch, Stewart, Kolasch & Birch, LLP

(57) ABSTRACT

A metallic hollow columnar member with a polygonal cross-section having at least five vertices and sides extending between the vertices, is disclosed. The polygonal cross-section is divided by two vertices (A, B) with small inside angles into two perimeter segments with a perimeter comprising one or more sides, and at least one of the two perimeter segments contains at least four sides. The respective inside angles of at least three vertices (V(i)) included in the perimeter segment which includes the at least four sides are equal to or less than 180°, the distance (SS(i)) between each of the at least three vertices (V(i)) and a straight line (L) connecting the two vertices (A, B) is shorter than ½ of the distance between the two vertices (A, B), and the inside angle of the vertex (C) with the smallest inside angle among the at least three vertices (V(i)) is larger than the inside angles of the two vertices (A, B). Vertices (VI) are present on the perimeter segment including the at least four sides, respectively between the vertex (C) with the smallest inside angle among the at least three vertices (V(i)) and one (A) of the two vertices (A, B), and between the vertex (C) with the smallest inside angle and the other (B) of the two vertices (A, B), said vertices (VI) having inside angles larger than the inside angle of the vertex (C) with the smallest inside angle.

4 Claims, 9 Drawing Sheets

(56) References Cited

U.S. PATENT DOCUMENTS

| | | | |
|---|---|---|---|
| 7,048,122 B2 * | 5/2006 | Dodson et al. | 206/443 |
| 7,228,672 B2 * | 6/2007 | Hayes et al. | 52/843 |
| 8,377,527 B2 * | 2/2013 | Winkler | 428/34.4 |
| 2006/0181072 A1 * | 8/2006 | Tamura et al. | 280/784 |
| 2006/0202511 A1 | 9/2006 | Tamura et al. | |
| 2007/0101674 A1 * | 5/2007 | Stinson | 52/732.1 |
| 2009/0026801 A1 * | 1/2009 | Murayama et al. | 296/187.05 |
| 2011/0015902 A1 * | 1/2011 | Cheng et al. | 703/1 |
| 2013/0140850 A1 * | 6/2013 | Tyan et al. | 296/187.03 |

FOREIGN PATENT DOCUMENTS

| | | |
|---|---|---|
| JP | 2004-203202 A | 7/2004 |
| JP | 2006-207724 A | 8/2006 |
| JP | 2009-292340 A | 12/2009 |
| JP | 2010-249236 A | 11/2010 |
| JP | 2011-11661 A | 1/2011 |
| WO | WO 2005/010396 A1 | 2/2005 |

* cited by examiner

METALLIC HOLLOW COLUMNAR MEMBER

TECHNICAL FIELD

The present invention relates to a thin-walled hollow columnar member, which constitutes a frame and is formed from a metal such as steel, aluminum, stainless steel or titanium, etc.

BACKGROUND ART

In recent years, in the automotive field, in order to reduce the weight of a vehicle body of a motorcar while maintaining or improving collision safety of the motorcar and reduce carbon dioxide emissions so as to improve the environmental performance of the motorcar, there are many approaches for improving the rigidity of a frame member such as a crash box, etc., of the motorcar, by modifying a cross-section of the frame member. In order to increase the rigidity of the frame member, a distribution of sectional property (or strength balance) of the frame member in the longitudinal direction thereof is important. If the design of the frame member is inappropriate, in the case of a forward collision of the motorcar, a frame positioned at a rear side of the crash box may be deformed before the deformation of the crash box positioned at a front of a frame of the motorcar. Further, in a collision experiment of a motorcar, a boundary condition such as a loading direction is not constant, whereby a certain degree of error occurs. Therefore, it is necessary that an energy absorbing member, a major deformation mode of which is a crushing mode in the axial direction of the crash box, etc., be highly robust, wherein impact-absorbing performance of the member is not considerably changed due to a change in the boundary condition.

In this regard, the "strength balance" means a second moment of area calculated from a plurality of cross-sectional shapes perpendicular to the longitudinal direction of the frame and characteristics of material applied to the frame, and/or a distribution of maximum tolerable buckling load in the longitudinal direction. Further, the "impact-absorbing performance" means an amount of energy absorption per unit amount of crushing in the axial direction, and the "robustness" means invariance of the impact-absorbing performance with respect to the change in the dynamic boundary condition.

As prior art, patent literature 1 discloses an impact absorbing member having a groove concaved toward inside the member, wherein a cross-sectional shape in at least a part in the axial direction is a closed cross-section having a plurality of vertices.

Patent literature 2 describes an energy absorbing member constituted by an extruded member of aluminum alloy having a hollow rectangular cross-section, wherein a rectangular cross-sectional projecting part is arranged outside a wall surface part of the member.

Patent literature 3 discloses a front side frame of a motorcar having beads on a lateral side thereof, the beads extending in the axial direction and projecting inside or outside the lateral side.

Patent literature 4 describes an impact absorbing member having a generally C-shaped cross-section which opens outward in the vehicle width direction.

Further, patent literature 5 describes an impact absorbing member having a polygonal cross-section, wherein the length of one side of the polygonal cross-section, the lengths of two sides which sandwiches the one side, and a range of the angle constituted by the two sides are limited.

CITATION LIST

Patent Literature

PLT 1: Japanese Unexamined Patent Publication (kokai) No. 2006-207724
PLT 2: Japanese Unexamined Patent Publication (kokai) No. 2002-12165
PLT 3: Japanese Unexamined Patent Publication (kokai) No. H08-108863
PLT 4: Japanese Unexamined Patent Publication (kokai) No. 2009-292340
PLT 5: International Publication No. WO 2005/010396

SUMMARY OF INVENTION

Problem to be Solved by the Invention

The techniques of PLTs 1 to 3 are intended to increase the total number of vertices in the cross-section so that cross-sectional force per unit length of the member due to the compressive deformation is significantly improved by forming the drastic concave-convex shape. Therefore, in PLTs 1 to 3, it is necessary to redesign the entire frame in view of the strength balance of the frame. If the technique is partially applied to the frame, the overall strength balance of the frame is deteriorated, and the frame is deformed at an unexpected portion thereof, whereby the amount of energy absorption of the member may be decreased. Further, since the deformation mode may be unstable due to the drastic concave-convex shape, the member may not be stably crushed and deformed in the axial direction.

On the other hand, in PLTs 4 and 5, it is not necessary to form the concave-convex shape, and the cross-sectional force per unit length of the member due to the compressive deformation is mildly improved, whereby the crushing deformation mode may be stable in the axial direction. However, in any of PLTs 4 and 5, the arrangement of inside angles of the vertices of the polygonal shape is inappropriate. In other words, depending on the loading direction, the vertex may disappear due to buckling of the polygonal shape be eliminated, whereby the cross-sectional force may be significantly lowered.

The present invention was made in order to provide a technique for improving the impact absorbing performance without deteriorating the strength balance, and a member to which the technique is applied.

Means for Solving the Problem

The inventors of this case examined the relationship between the deformation mode and the impact absorption performance (or the amount of energy absorption) when a member was crushed, and found that behavior of vertices in a transverse cross-section of the member significantly contributes to the amount of energy absorption when the crushing deformation. When the vertex disappears or vanishes due to the deformation such as flexion during the crushing, a reactive force is significantly lowered. Therefore, although it is effective to avoid the flexion at the vertex, it is difficult to control the flexion in particular when the crushing deformation in the axial direction. As a result of analysis and experiments regarding the crushing of a member in the axial direction, the inventors found that the vanishment of the vertex when the crushing deformation can be avoided by controlling the position of the flexion. Since this technique is intended to lower a reduction rate of the reactive force, the overall strength balance is not deteriorated.

According to the present invention, a metallic hollow columnar member with a polygonal cross-section having at least five vertices and sides extending between the vertices, is provided, wherein: the polygonal cross-section is divided by two vertices (A, B) with small inside angles into two perimeter segments with a perimeter comprising one or more sides, the at least one of the two perimeter segments containing at least four sides, the respective inside angles of at least three vertices (V(i) (i=1, 2, 3, . . . )) included in the perimeter segment which includes the at least four sides are equal to or less than 180 degrees, a distance (SS(i) (i=1, 2, 3, . . . )) between each of the at least three vertices (V(i) (i=1, 2, 3, . . . )) and a straight line (L) connecting the two vertices (A, B) is shorter than ½ of a distance between the two vertices (A, B), the inside angle of a vertex (C) with the smallest inside angle among the at least three vertices (V(i)) is larger than the inside angles of the two vertices (A, B), and vertices (VI) are present on the perimeter segment including the at least four sides, respectively between the vertex (C) with the smallest inside angle among the at least three vertices (V(i)) and one (A) of the two vertices (A, B), and between the vertex (C) with the smallest inside angle and the other (B) of the two vertices (A, B), said vertices (VI) having inside angles larger than the inside angle of the vertex (C) with the smallest inside angle.

According to another aspect of the present invention, a metallic hollow columnar member with a polygonal cross-section having at least five vertices and sides extending between the vertices, is provided, wherein: the metallic hollow columnar member comprises two joined sections (J), the polygonal cross-section is divided by two vertices (A, B) in the vicinity of the two joined sections (J) into two perimeter segments with a perimeter comprising one or more sides, the at least one of the two perimeter segments containing at least four sides, the respective inside angles of at least three vertices (V(i) (i=1, 2, 3, . . . )) included in the perimeter segment which includes the at least four sides are equal to or less than 180 degrees, a distance (SS(i) (i=1, 2, 3, . . . )) between each of the at least three vertices (V(i) (i=1, 2, 3, . . . )) and a straight line (L) connecting the two vertices (A, B) is shorter than ½ of a distance between the two vertices (A, B), and vertices (VI) are present on the perimeter segment including the at least four sides, respectively between the vertex (C) with the smallest inside angle among the at least three vertices (V(i)) and one (A) of the two vertices (A, B), and between the vertex (C) with the smallest inside angle and the other (B) of the two vertices (A, B), said vertices (VI) having inside angles larger than the inside angle of the vertex (C) with the smallest inside angle.

The metallic hollow columnar member of the invention is suitable for a frame member, in particular, which constitutes a frame of a motorcar.

In the present invention, the "polygon" means a diagram formed by intersection points of straight lines corresponding to each extended side. The metallic hollow columnar member with the polygonal cross-section includes a member with vertices having curvatures.

According to the present invention, there is provided a member wherein impact absorbing performance and robustness are improved without deteriorating strength balance.

EMBODIMENTS FOR CARRYING OUT THE INVENTION

First, basis of the present invention will be explained with reference to FIGS. 1 to 6.

In order to improve impact absorbing performance of a hollow columnar member with a polygonal cross-section, it is necessary to increase an amount of energy absorption per unit amount of crushing in the axial direction of the hollow columnar member. In order to increase the amount of energy absorption, it is important to maintain an average value of the reactive force generated when crushing the member at a high level.

Figure 1:
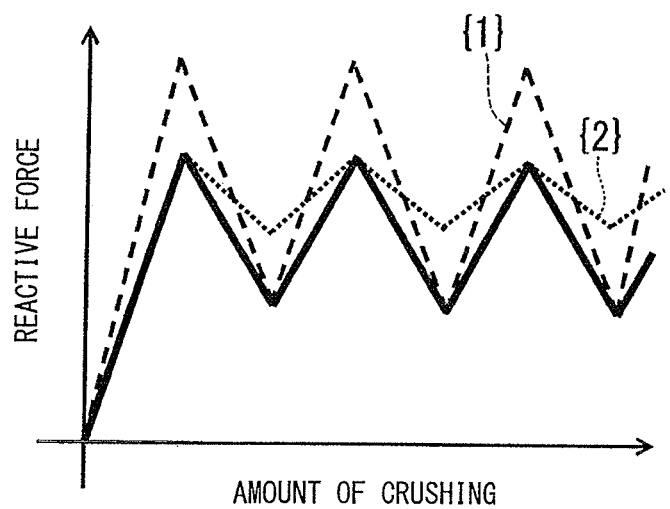
FIG. 1 is a diagram for schematically showing reactive force and an amount of crushing when a member is crushed, while explaining a method for improving impact absorbing performance.

To this end, it is necessary to (1) increase the reactive force which varies due to the deformation in the crushing, as indicated by a dashed line in FIG. 1, and (2) inhibit decrease in the reactive force which varies due to the deformation in the crushing, as indicated by a dotted line in FIG. 1.

As a result of analysis and experiments regarding the crushing of a member in the axial direction, the inventors found that (a) the increase in the reactive force when the crushing is affected mainly by the number of vertices of the transverse cross-section of the member before the deformation; (b) the decrease in the reactive force when the crushing is affected by the number of vertices of the transverse cross-section of the member during the deformation; and (c) the increase in the reactive force affects another neighboring member since the maximum reactive force is increase, while the decrease in the reactive force does not affect another neighboring member since the maximum reactive force is not changed.

Generally, in the hollow columnar member with the polygonal cross-section, the vertex of the polygonal cross-section may disappear or vanish due to the flexion during the crushing. In this case, the member is deformed while having a cross-section with vertices fewer than original vertices. When the vertex of the cross-section vanishes, the length of a side of the polygonal cross-section is increased, whereby a cycle of buckling is extended. Since the cycle of buckling corresponds to a fluctuation cycle of the reactive force, the number of peaks of the reactive force during the crushing is decreased when the cycle of buckling is extended. Therefore, the maximum reactive force of the member before the buckling may be raised by increasing the number of the vertices of the polygonal cross-section. However, since an inside angle of the vertex is increased when the number of the vertices of the polygonal cross-section is increased, the member is easily to be flexed, whereby the reactive force after the member is flexed may be significantly decreased.

Since it is inevitable that the hollow columnar member with the polygonal cross-section is flexed in the crushing, it is important how the member is flexed, in order to improve the impact absorbing performance of the member. Further, since the reactive force is decreased due to the flexion, an amount of decrease in the reactive force may be controlled by controlling the flexion so as to reduce the number of vertices which vanish when the deformation occurs.

As a result of analysis and experiments regarding the crushing of a hollow columnar member with a polygonal cross-section, the inventors found that the vanishment of the vertices can be avoided by controlling the position of flexion, not by reducing a frequency of flexion; and that the inside angle of the vertex is an important factor for controlling the position of flexion.

Figure 2:
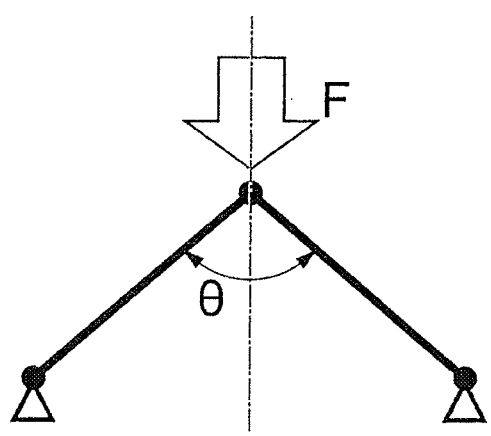
FIG. 2 is a schematic view for explaining the relationship between maximum tolerable flexion load and an inside angle.
Figure 3:
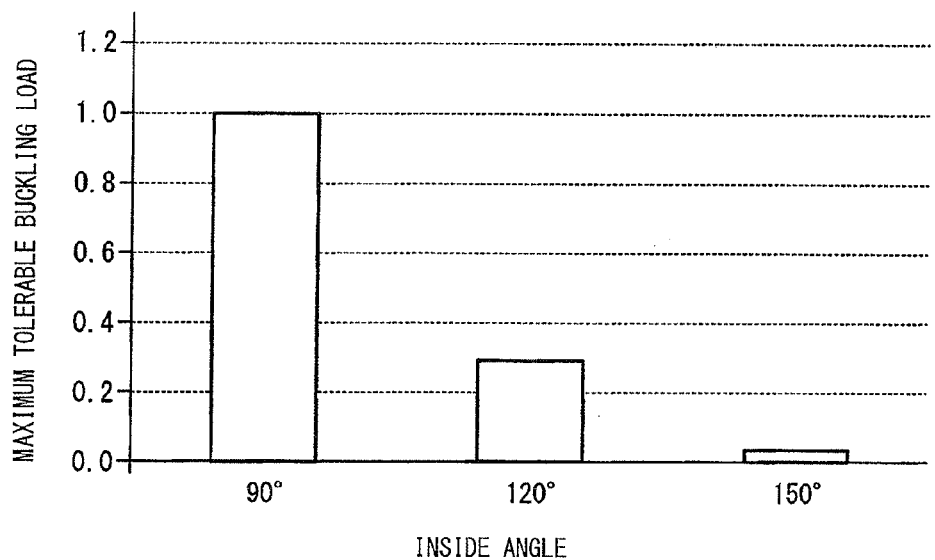
FIG. 3 is a graph for explaining the relationship between the maximum tolerable flexion load and the inside angle.

Generally, in the hollow columnar member with the polygonal cross-section, as the inside angle of the vertex in the transverse cross-section is increased, the hollow columnar member may be easily flexed. For example, as shown in FIG. 2, in a system including two elastic deformable bars, wherein each bar has a longitudinal direction only and is connected to each other at one end thereof at an angle θ and the opposite end of each bar is fixed, the maximum tolerable flexion load immediately before the initiation of the flexion, when a load is applied to the connecting part or a vertex from the above as indicated by an arrow F, can be analyzed in view of material mechanics. As shown in FIG. 3, when the maximum tolerable flexion load at angle θ of 90 degrees is equal to 1.00, the maximum tolerable flexion load at angle θ of 120 degrees and 150 degrees are approximately 0.30 and 0.04, respectively.

As described above, it can be understood from FIG. 3 that the maximum tolerable flexion load is very sensitive to the inside angle of the vertex. Therefore, by properly determining the magnitude of the inside angle of each vertex in the polygonal cross-section, the deformation mode of the hollow columnar member with the polygonal cross-section can be controlled, and the robustness thereof can be improved.

Figure 4:
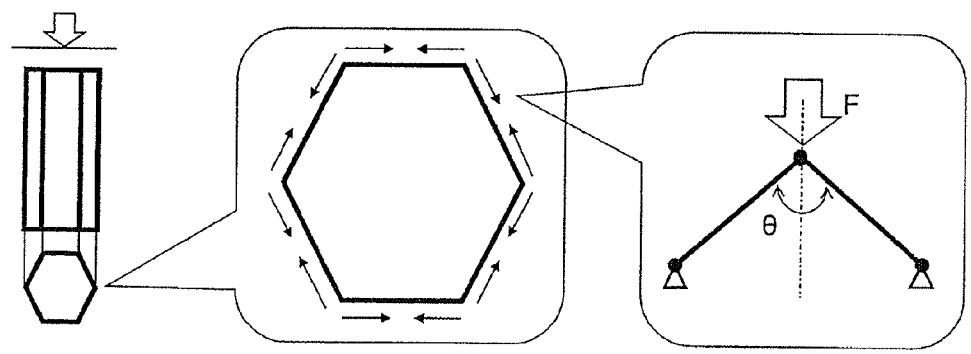
FIG. 4 is a schematic view for explaining a dynamic state when a hollow columnar member is crushed in an axial direction.
Figure 5:
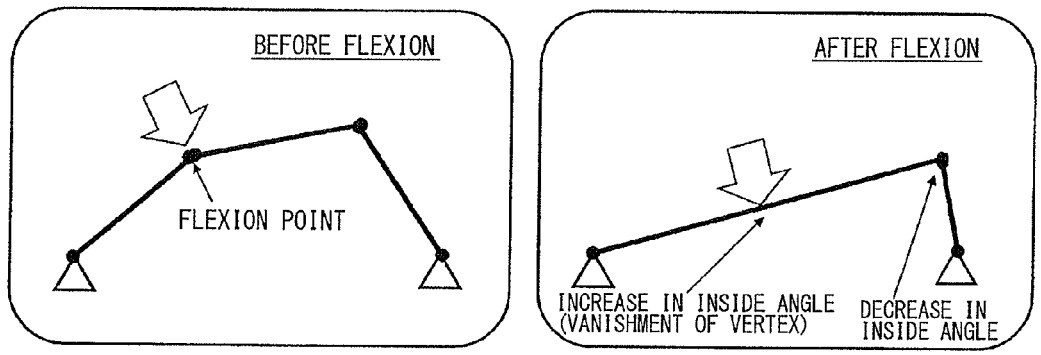
FIG. 5 is a schematic view for explaining geometric deformation and change in the inside angle when flexion.
Figure 6:
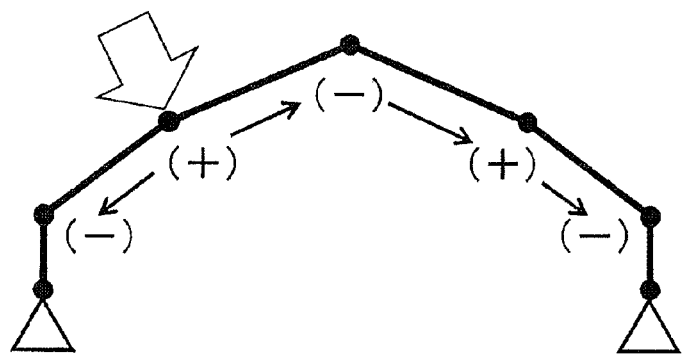
FIG. 6 is a schematic view of a perimeter segment for explaining change in inside angles of vertices when a polygonal cross-section is flexed at one vertex.

On the other hand, in the crushing deformation of the hollow columnar member with the polygonal cross-section, a force is applied to the hollow columnar member in the axial direction thereof. Before the deformation, as shown in FIG. 4, a tensile load is applied to each vertex of the polygonal cross-section, wherein the tensile load is directed to the neighboring vertices. When the hollow columnar member is flexed, the inside angle of the vertex at the flexed portion is increased (+), while the inside angle of the vertices neighboring the vertex at the flexed portion are decreased (−) under the geometric condition. Therefore, the periphery of the flexed portion is poorly flexed (FIG. 5). Similarly, the inside angle of a further neighboring vertex is increased (+). In other words, when the flexion occurs at one vertex, the inside angles are alternately increased or decreased ((+) or (−)), whereby the vertex having the increased inside angle is likely to vanish or disappear (FIG. 6).

In view of such flexion of the hollow columnar member, the present invention can be applied to a hollow columnar member with a polygonal cross-section having at least five vertices. Although depending on the loading direction when the crushing, the position in the polygonal cross-section, where the flexion occurs and the vertex vanishes, is mainly determined by the positions and the magnitudes of the inside angles of the vertices, and the existence of a connecting portion of a flange, etc. In addition, it is preferable that the hollow columnar member be made from metal, since it is important that the material of the hollow column member has high strength and ductility in order to improve energy absorbing performance, and has small anisotropy (i.e., maintains the ductility even in a complicated stress condition).

On the other hand, since the flexion easily occurs in a "compact-type" crushing deformation in the axial direction, it is preferable that the hollow columnar member with the polygonal cross-section has dimensions so that the "compact-type" crushing deformation occurs in the axial direction. Concretely, a ratio of a distance "D" between the vertices of the polygonal cross-section and a plate thickness "t" (t/D) is preferably 0.005 or more, more preferably, 0.010 or more. Further, a ratio of a longitudinal length "H" of the hollow columnar member and a minimum length "h" of the polygonal cross-section (h/H) is preferably 0.10 or more, more preferably, 0.15 or more. In this regard, the "minimum length" of the polygonal cross-section means a minimum distance between two parallel straight lines which tangentially contact the transverse cross-section of the hollow columnar member. In addition, the "compact-type" is explained in a plurality of documents, and means the deformation mode which is crushed by repeating a constant pattern when the crushing deformation in the axial direction.

Next, a first embodiment of the present invention is explained.

Figure 7:
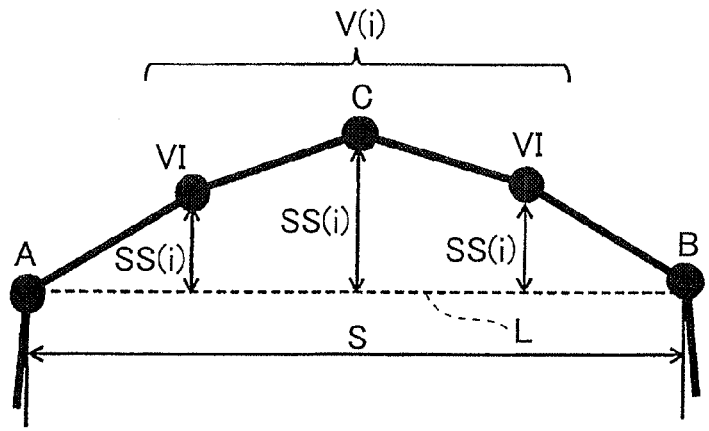
FIG. 7 is a schematic view of a perimeter segment of a polygonal cross-section of the hollow columnar member as an example of the invention.
Figure 8:
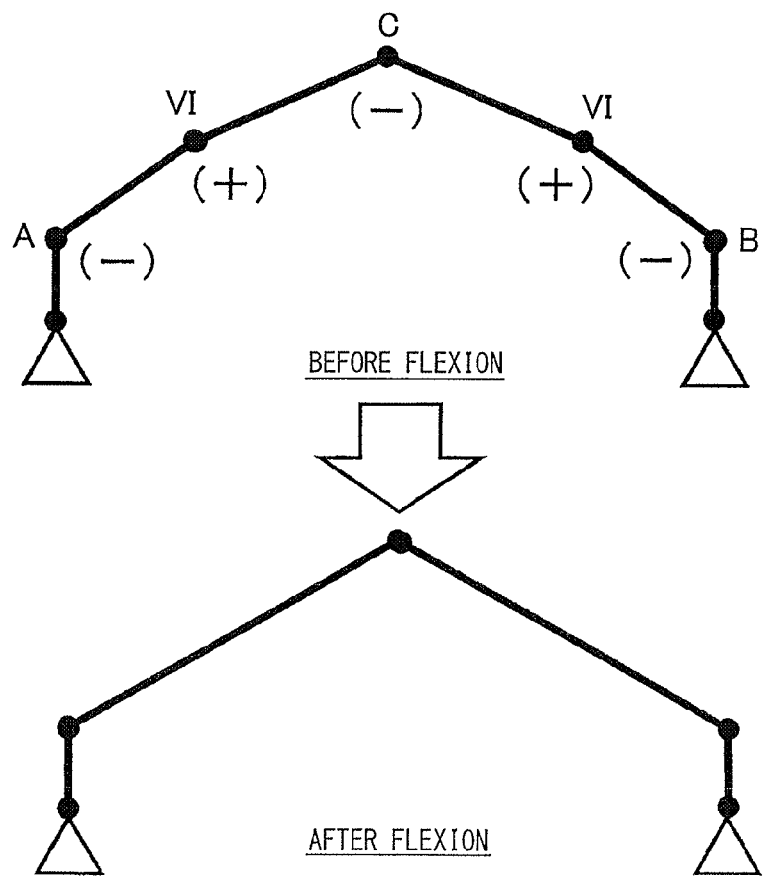
FIG. 8 is a view of an example of a perimeter segment of a polygonal cross-section of the invention, schematically showing a transverse cross-section of the hollow columnar member before and after the flexion, wherein, among one or more vertices (VI) presenting on approximate straight lines of an approximate polygon between two vertices A, C and between two vertices B, C, the inside angle of at least one vertex is larger than the inside angle of vertex C. In this regard, mark (+) indicates a vertex, among vertices between vertices A and B, having the inside angle larger than the inside angles of neighboring vertices, and mark (−) indicates a vertex, among vertices between vertices A and B, having the inside angle smaller than the inside angle of at least one of the neighboring vertices.

First, in a polygonal cross-section having at least five vertices and sides extending between the vertices, two vertices "A" and "B" with small inside angles are selected, and a perimeter of the polygonal cross-section is divided by two vertices A and B into two perimeter segments with one or more sides. In this regard, two vertices A and B are selected so that at least one of the two perimeter segments contains at least four sides. Next, a straight line connecting two vertices A and B is determined as "L," and the length of straight line L (i.e., a distance between two vertices A and B) is determined as "S." Further, a distance between straight line L and each of the at least three vertices (V(i) (i=1, 2, 3, . . . )) included in the perimeter segment which includes the at least four sides is determined as "SS(i)" (i=1, 2, 3, . . . ). In this regard, if SS(i)<0.5S is true (i.e., the inside angle is larger than 90 degrees) and the inside angles of vertices V(i) in the polygonal cross-section are all equal to or less than 180 degrees (FIG. 7), then at least one of vertices V(i) on the perimeter segments between vertices A and B is likely to vanish due to the flexion.

When at least three vertices V(i) includes a vertex with the inside angle of 180 degrees or more, the side extends outward from the vertex. As a result, when the hollow columnar member is crushed, the vertex with the inside angle of 180 degrees or more is deformed in a manner significantly different from the other vertices. Therefore, the deformation of the hollow columnar member during the crushing is complicated, whereby it is difficult to control the deformation.

On the other hand, when SS(i)<αS (α>0) is true, as α is decreased (i.e., as the inside angles of vertices V(i) are increased), at least one of vertices V(i) is likely to vanish due to the flexion.

Further, in the present embodiment, the inside angle of vertex C with the smallest inside angle among vertices V(i) is larger than the inside angles of the two vertices A, B. Also, among the vertices presenting on the selected perimeter segment and between vertices A and B or between vertices B and C, vertices having inside angles larger than the inside angle of vertex C are referred to as vertices V(I). Vertex V(I) preferentially becomes a starting point of the flexion when the hollow columnar member is crushed and deformed, and vertices A, B and C other than vertices V(I) are hardly flexed, whereby the vanishment of vertices A, B and C can be avoided. In other words, in this embodiment, $\phi A<\phi C<\phi VI$ is true, and $\phi B<\phi C<\phi VI$ is true. In this regard, $\phi A$, $\phi B$, $\phi C$ and $\phi VI$ represent the inside angles of vertices A, B, C and VI, respectively.

Figure 9:
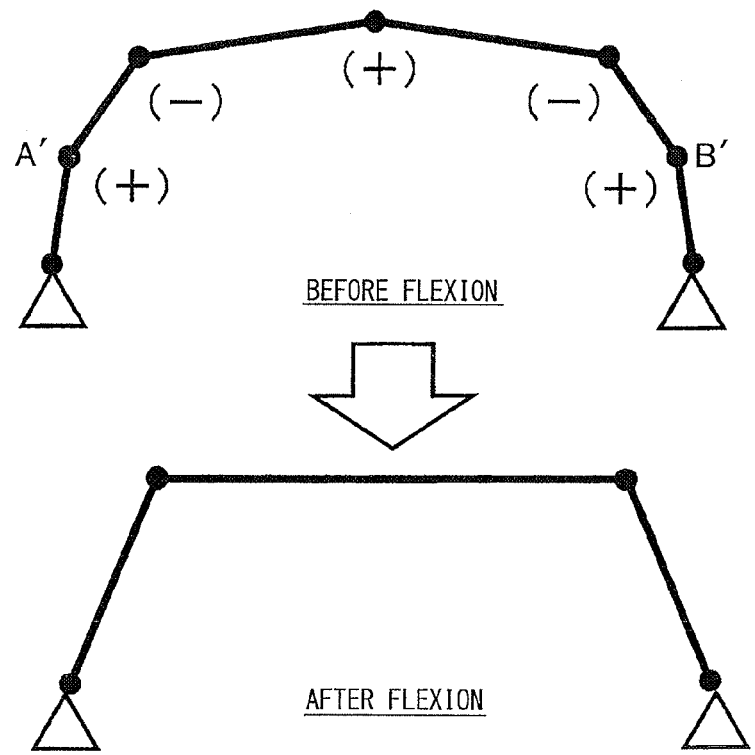
FIG. 9 is a view schematically showing a transverse cross-section of the hollow columnar member before and after the flexion, wherein, three or more points do not satisfy the condition of the invention, the points being positioned on approximate straight lines of an approximate polygon between two vertices A' and B' among vertices of a perimeter segment of a transverse polygonal cross-section having five or more vertices. In this regard, mark (+) indicates a vertex, among vertices between vertices A' and B', having the inside angle larger than the inside angle of at least one of the neighboring vertices, and mark (−) indicates a vertex, among vertices between vertices A' and B', having the inside angle smaller than the inside angles of neighboring vertices.

On the other hand, when the condition of the present invention is not satisfied (i.e., as shown in FIG. 9, among at least three vertices presenting on the perimeter segment and between two vertices A' and B', the inside angle of vertex C' is larger than the inside angles of other vertices $V_1$ and $V_2$), the more vertices vanish due to the flexion when the hollow columnar member is crushed. In the example of FIG. 9, vertices A', B', $V_1$ and $V_2$ will vanish, as a result, the reactive force of the hollow columnar member will be significantly lowered.

In order that vertices V(I) are preferentially flexed, it is preferable that the difference between the inside angles of vertices VI and C be as large as possible. Preferably, the difference is 10 degrees, and more preferably, the difference is 20 degrees. In addition, when a plurality of vertices C having the same inside angle exist, vertices C are adjacent to each other. If they are not adjacent to each other (i.e., two points having small inside angles in FIG. 9 correspond to vertices C), the number of vanishing vertices cannot be reduced as shown in FIG. 9.

In addition, it is important that the above relationship between vertices A, B, C and VI be satisfied in at least a part of the transverse cross-section of the hollow columnar member, and it is not necessary that the above relationship be satisfied in all of the vertices of the cross-section. For example, in the case that the member partially has a longitudinal bead and the cross-section includes the vertex with the inside angle of 180 degrees or more, if the relationship relating to the inside angle of the invention is satisfied in the other area, the reduction in the varying reactive force due to the deformation when the crushing can be avoided.

By increasing areas where the distribution and the positional relationship of the inside angles of the vertices in the transverse cross-section as described above are satisfied, the position of flexion in the polygonal cross-section can be controlled, whereby the number of vanishing vertices can be reduced.

Next, another embodiment of the present invention is explained.

Figure 10:
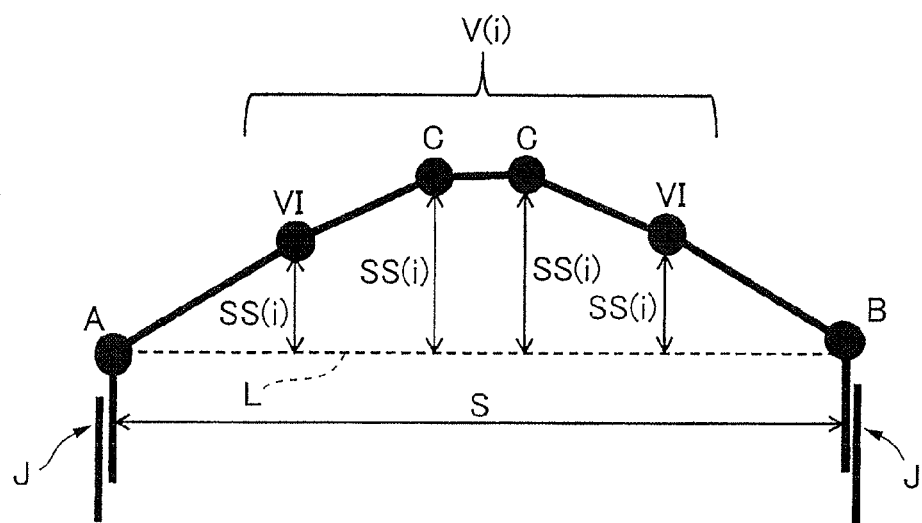
FIG. 10 is an explanatory view schematically showing a perimeter segment of a polygonal cross-section of the hollow columnar member as an example of the invention.
Figure 11:
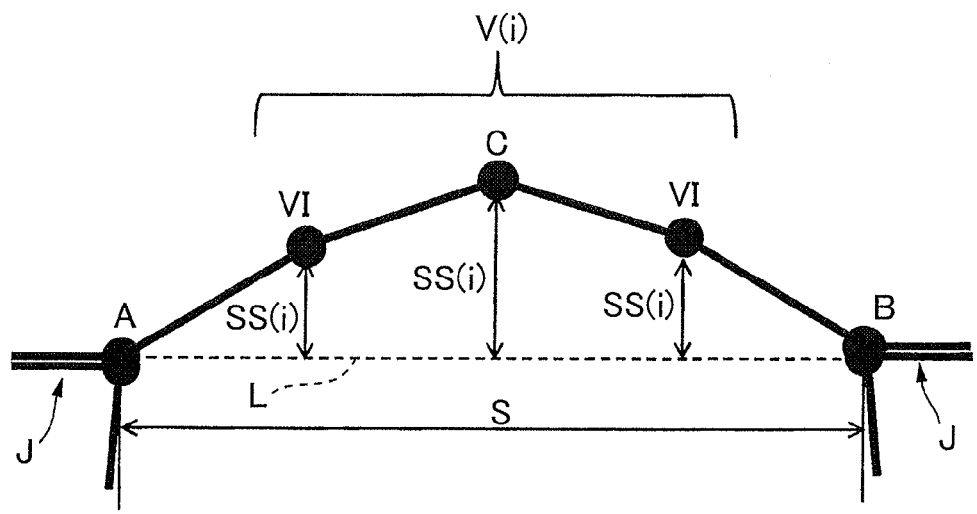
FIG. 11 is an explanatory view schematically showing a perimeter segment of a polygonal cross-section of the hollow columnar member as an example of the invention.

When the hollow columnar member has two joined sections "J" such as flanges, the thickness of joined section J is relatively large due to overlapping of the plates. Therefore, vertices A and B of the transverse cross-section, nearest to two joined sections J, hardly vanish or disappear due to the flexion. When a straight line connecting two vertices A and B is determined as "L," the length of straight line L (i.e., the distance between vertices A and B) is determined as "S," and the distance between straight line L and each of the at least three vertices (V(i) (i=1, 2, 3, . . . )) included in the perimeter segment which includes the at least four sides is determined as "SS(i)" (i=1, 2, 3, . . . ), if SS(i)<0.5S is true (i.e., the inside angle is larger than 90 degrees) and the inside angles of vertices V(i) in the polygonal cross-section are all equal to or less than 180 degrees (FIGS. 10 and 11), then at least one of vertices V(i) on the perimeter segments between vertices A and B is likely to vanish due to the flexion.

When at least three vertices V(i) include a vertex with the inside angle of 180 degrees or more, the side extends outward from the vertex. As a result, when the hollow columnar member is crushed, the vertex with the inside angle of 180 degrees or more is deformed significantly different from the other vertices. Therefore, the deformation of the hollow columnar member during the crushing is complicated, whereby it is difficult to control the deformation.

On the other hand, when SS(i)<αS (α>0) is true, as α is decreased (i.e., as the inside angles of vertices V(i) are increased), at least one of vertices V(i) is likely to vanish due to the flexion.

Further, in the present embodiment, the inside angle of vertex C with the smallest inside angle among vertices V(i) is larger than the inside angles of the two vertices A, B. Also, among the vertices presenting on the selected perimeter segment and between vertices A and B or between vertices B and C, vertices having inside angles larger than the inside angle of vertex C are referred to as vertices V(I). Vertex V(I) preferentially becomes a starting point of the flexion when the hollow columnar member is crushed and deformed, and vertices A, B and C other than vertices V(I) are hardly flexed, whereby the vanishment of vertices A, B and C can be avoided. In other words, in this embodiment, $\phi A<\phi C<\phi VI$ is true, and $\phi B<\phi C<\phi VI$ is true. In this regard, $\phi A$, $\phi B$, $\phi C$ and $\phi VI$ represent the inside angles of vertices A, B, C and VI, respectively.

On the other hand, when the condition of the present invention is not satisfied (i.e., as shown in FIG. 9, among at least three vertices presenting on the perimeter segment and between two vertices A' and B', the inside angle of vertex C' is larger than the inside angles of other vertices $V_1$ and $V_2$), the more vertices vanish due to the flexion when the hollow columnar member is crushed. In the example of FIG. 9, vertices A', B', $V_1$ and $V_2$ will vanish, as a result, the reactive force of the hollow columnar member will be significantly lowered.

In order for vertices V(I) to be preferentially flexed, it is preferable that the difference between the inside angles of vertices VI and C be as large as possible. Preferably, the difference is 10 degrees, and more preferably, 20 degrees. In addition, when a plurality of vertices C having the same inside angle exist, vertices C are adjacent to each other. If they are not adjacent to each other (i.e., two points having small inside angles in FIG. 9 correspond to vertices C), the number of vanishing vertices cannot be reduced as shown in FIG. 9.

In addition, it is important that the above relationship between vertices A, B, C and VI be satisfied in at least a part of the transverse cross-section of the hollow columnar member, and it is not necessary that the above relationship be satisfied in all of the vertices of the cross-section. For example, in the case that the member partially has a longitudinal bead and the cross-section includes the vertex with the inside angle of 180 degrees or more, if the relationship relating to the inside angle of the invention is satisfied in the other area, the reduction in the varying reactive force due to the deformation when the crushing can be avoided.

By creating an area including two joint sections J such as flanges, where the distribution and the positional relationship of the inside angles of the vertices in the transverse cross-section as described above are satisfied, the position of flexion in the polygonal cross-section can be controlled, whereby the number of vanishing vertices can be reduced.

The metallic hollow columnar member of the present invention is particularly suitable for a frame member which constitutes a frame of an automobile. In the automotive field, many designers and researchers address many problems: improving safety performance of collision, reducing vehicle body weight for improving fuel efficiency, and shortening a developing period for many vehicle types in view of globalization, etc.

Regarding the safety performance of collision, in Japan, a standard equivalent to UN uniform criteria (ECE rule), R94 (the protection of an occupant in the event of an offset collision) has been established, and applied to new models on or after 2007. This standard has also been applied to commercial vehicles weighing 2.5 tons or less. In the United States, a side pole impact at the speed of 32 km/h be added to FMVSS214 has been planned since 2009. Further, FMVSS301 has been revised so that an offset rear impact at the speed of 80 km/h has been used since 2006.

Regarding the fuel efficiency of an automobile, in Japan, the "Act on the Rational Use of Energy" has been revised and put in force since April, 2006, wherein the "Fuel Efficiency Standard for Heavy Duty Vehicles" should be achieved by 2015. In the United States, the federal government published a draft revision regarding a CAFE system for 2008-2011 model small trucks. In both the federal government and California, tightening of limitations in the next period is in discussion.

Regarding globalization, the amount of export of automobiles has significantly increased in recent years. For example, the amount of export in 2005 was rapidly increased by 22% in comparison to 2001. It is expected that overseas production will exceed domestic production of all makers in Japan, due to Japanese makers advancing into Russia, etc.

In view of such a situation, in order to shorten the design time, reduce in weight of the vehicle body, and improve the safety performance of collision at a rapid rate, the present invention may contribute the reduction of a burden of a car designer and the weight saving of the vehicle body, since the safety performance of collision may be improved only by arranging the distribution of the inside angles without changing the strength balance of the entire frame in the present invention. There are many components in the automobile to which the dynamic load is applied when the collision. In particular, the present invention may significantly contribute when designing an energy absorbing member, such as a crash box and a front side member which significantly contribute an amount of energy absorption when frontal collision, or a rear side member which significantly contribute an amount of energy absorption when rear collision.

Example

Hereinafter, the effect of the present invention will be explained with reference to examples.

Figure 12:
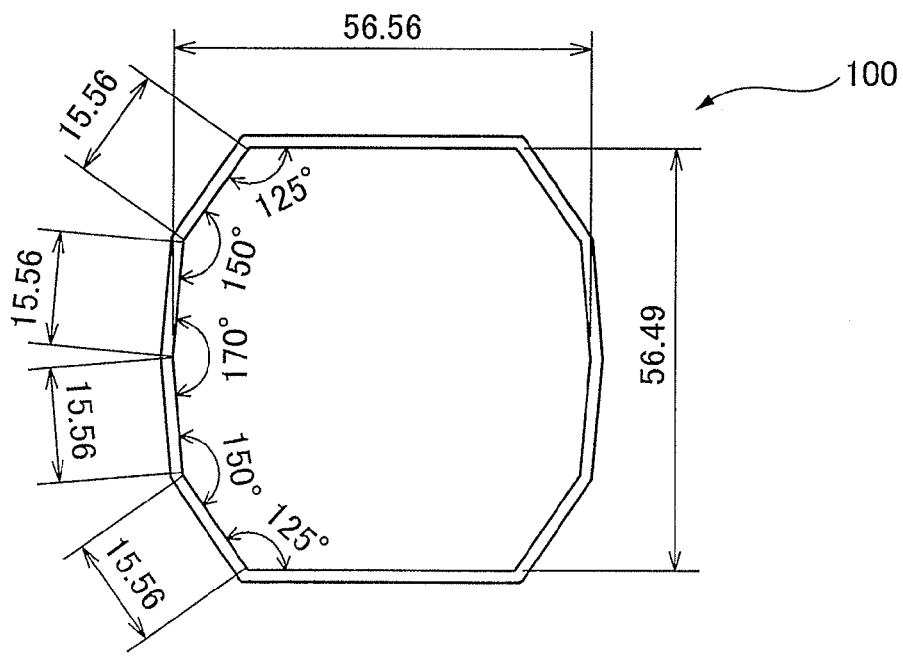
FIG. 12 is an explanatory view of a transverse cross-section and dimensions of a member as a comparative example.
Figure 13:
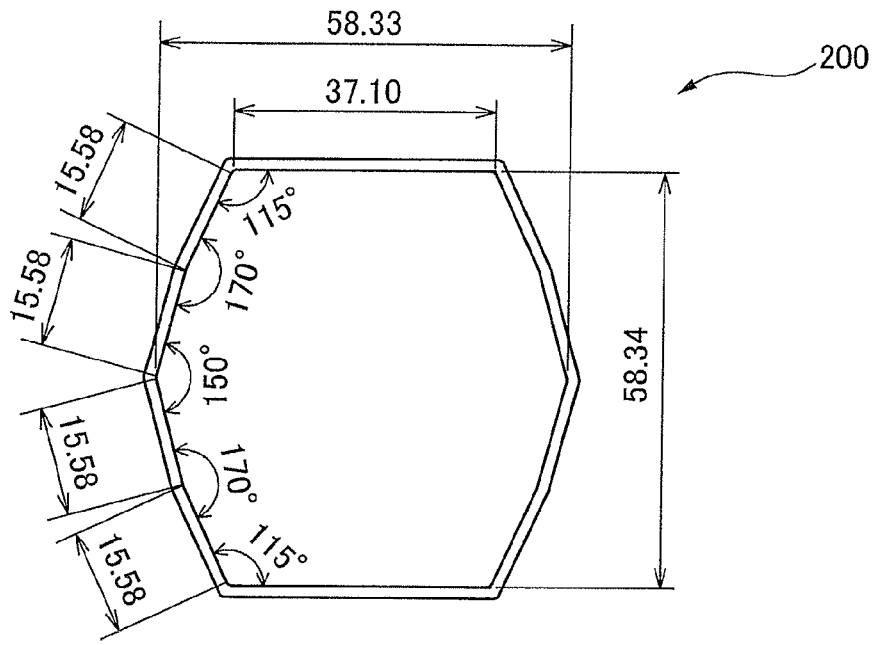
FIG. 13 is an explanatory view of a transverse cross-section and dimensions of a member as an embodiment of the invention.
Figure 14:
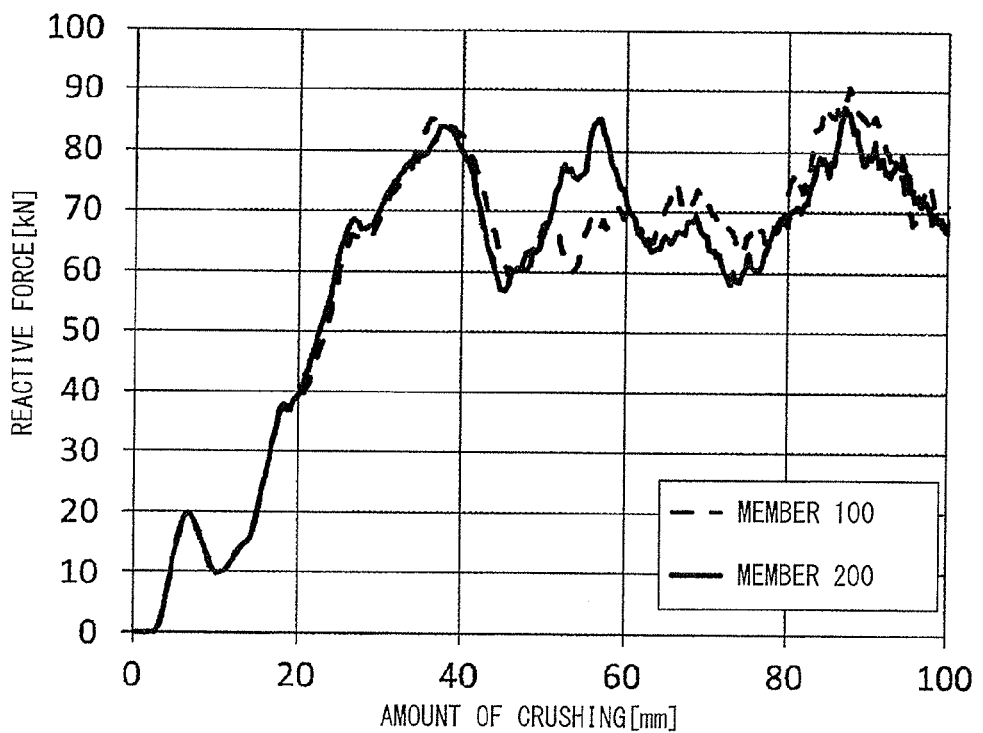
FIG. 14 is a comparison diagram of the relationship between reactive force and an amount of crushing generated when a thin-walled hollow columnar member is crushed.

First, as shown in FIGS. 12 and 13, in relation to thin-walled hollow columnar members 100 and 200 having two kinds of generally decagonal cross-sections, the inventors compared the relationship between a reactive force when crushing and an amount of crushing. The dimensions of the cross-sections are indicated in FIG. 12 (member 100) and FIG. 13 (member 200). Member 200 corresponded to the shape of one example of the present invention. Both members 100 and 200 were made from JSC590Y steel, had a length of 300 mm, a plate thickness of 1.6 mm. Further, all of the corners of the members had a curvature of 1.35 mm$^{-1}$. When an impact body having the weight of 700 kg collided with each member in the axial direction (or the direction perpendicular to the sheet of FIGS. 12 and 13) and in the compressive direction at an initial speed of 5.0 m/s, the relationship between the reactive force when crushing and the amount of crushing was evaluated by analysis, and compared between members 100 and 200 (FIG. 14).

Figure 15:
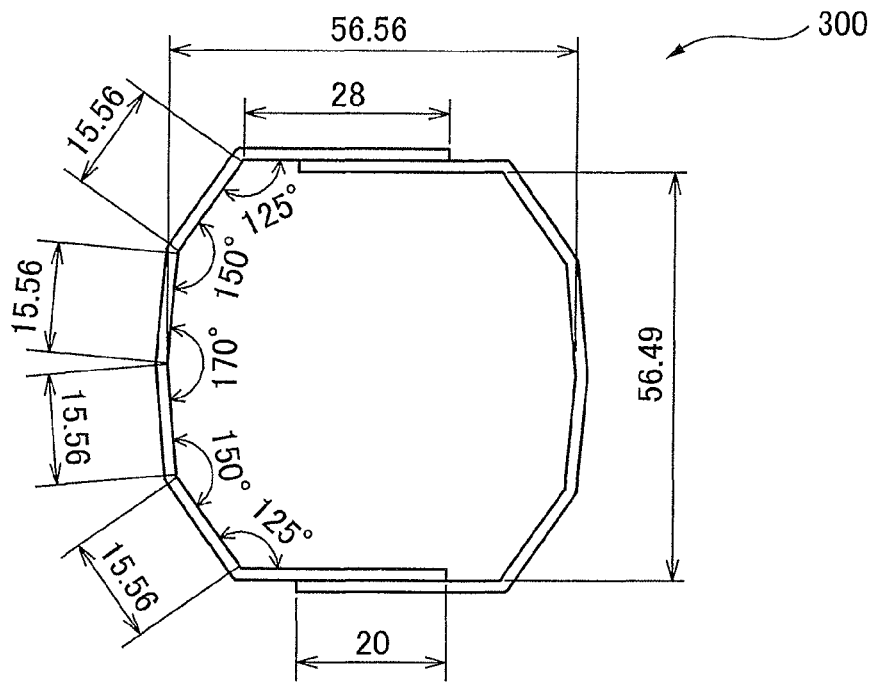
FIG. 15 is an explanatory view of a transverse cross-section and dimensions of a member as a comparative example.

Next, in relation to thin-walled hollow columnar members 300 and 400 having two kinds of generally decagonal cross-sections, the inventors compared the relationship between a reactive force when crushing and an amount of crushing. The dimensions of the cross-sections are indicated in FIG. 15 (member 300) and FIG. 16 (member 400). Member 400 corresponded to the shape of one example of the present invention. Both members 300 and 400 were made from JSC590Y steel, had a length of 150 mm, a plate thickness of 1.6 mm. Further, all of the corners of the members had a curvature of 1.35 mm$^{-1}$. When an impact body having the weight of 700 kg collided with each member in the axial direction (or the direction perpendicular to the sheet of FIGS. 15 and 16) and in the compressive direction at an initial speed of 5.0 m/s, the relationship between the reactive force when crushing and the amount of crushing was evaluated by analysis, and compared between members 300 and 400 (FIG. 17).

Figure 16:
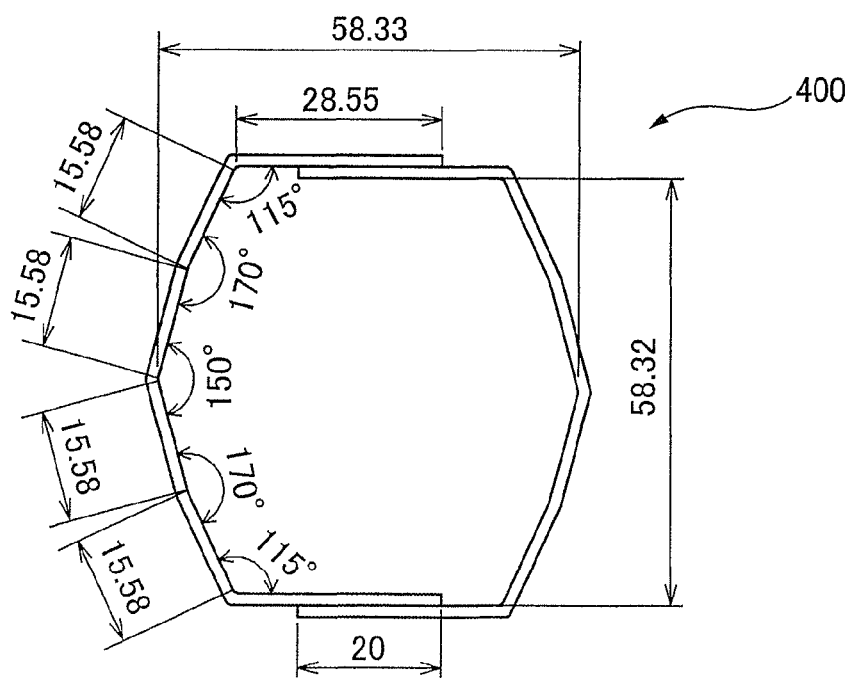
FIG. 16 is an explanatory view of a transverse cross-section and dimensions of a member as an embodiment of the invention.
Figure 17:
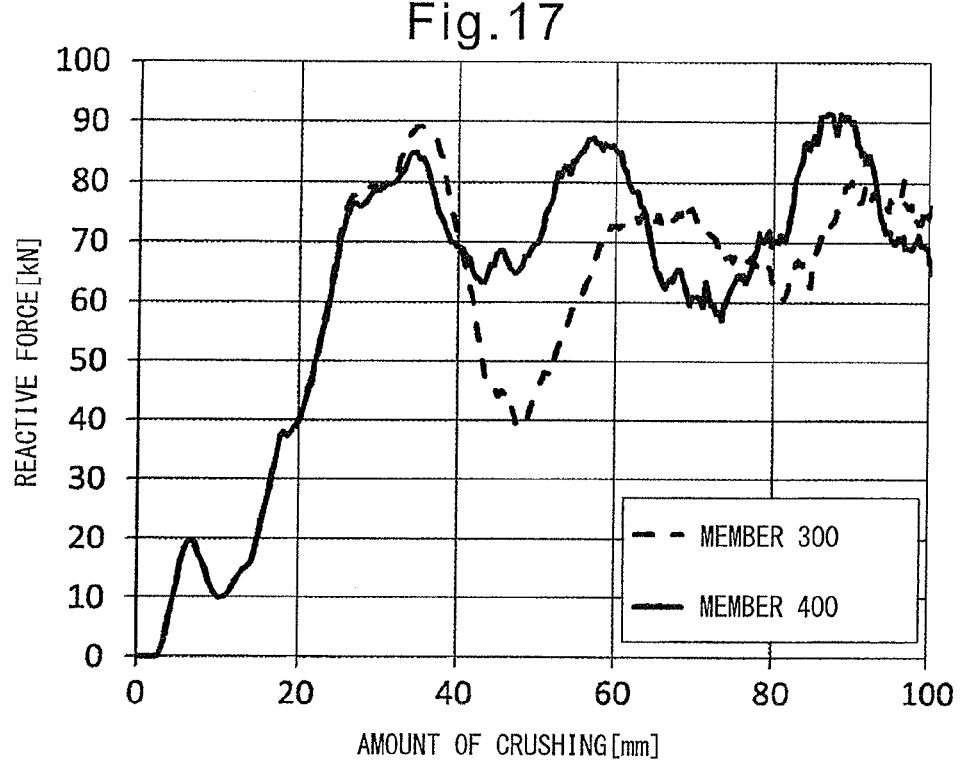
FIG. 17 is a comparison diagram of the relationship between reactive force and an amount of crushing generated when a thin-walled hollow columnar member is crushed.
Figure 18:
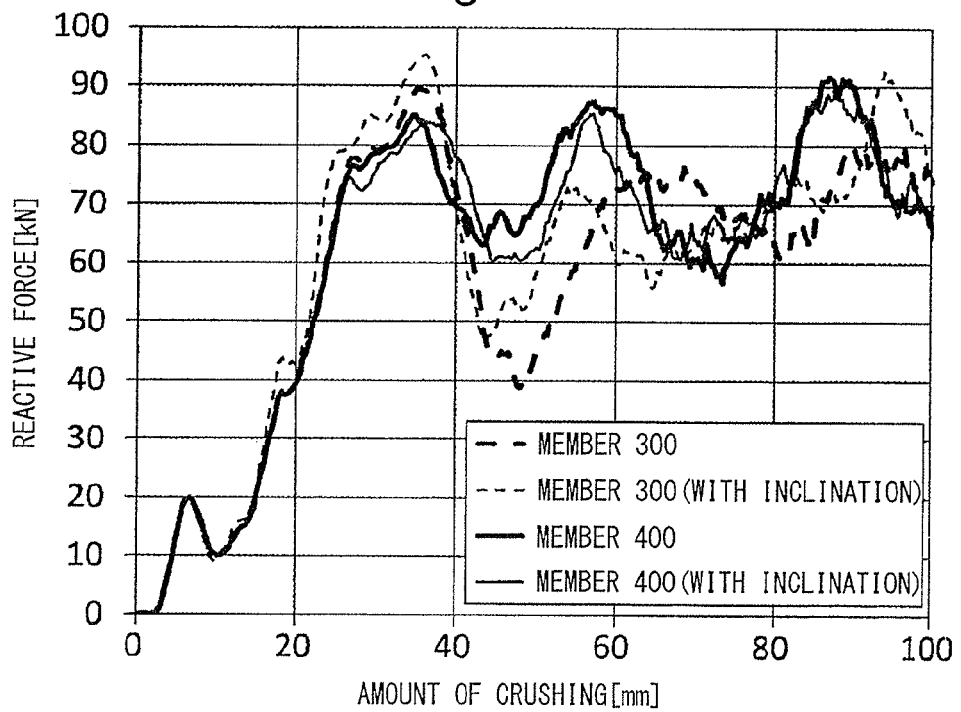
FIG. 18 is a comparison diagram of the relationship between reactive force and an amount of crushing generated when a thin-walled hollow columnar member is crushed.

Further, in relation to members 300 and 400, the inventors carried out the similar crushing analysis wherein the collision angle was inclined by one degree relative to the axial direction (i.e., inclined by one degree toward the right side relative to the direction perpendicular to the sheet of FIGS. 15 and 16), and observed the effect due to change in the boundary condition of the relationship between the reactive force and the amount of crushing (FIG. 18).

In any of the examples, in the member of the present invention, although an initial peak of the reactive force was the same as the member which was not included in the invention, the significant reduction of the reactive force from the initial peak when the flexion was limited more than the member out of the invention. Further, even when the boundary condition was changed, it was observed that the relationship between the reactive force and the amount of crushing (i.e., the impact absorbing performance) was not substantially changed in the member of the invention. According to the present invention, the impact absorbing performance and the robustness may be improved while maintaining the maximum reactive force of the member.

The invention claimed is:

1. A metallic hollow columnar member with a polygonal cross-section having at least five vertices and sides extending between the vertices, wherein:
    the polygonal cross-section is divided by two vertices (A, B) with small inside angles into two perimeter segments with a perimeter comprising one or more sides, the at least one of the two perimeter segments containing at least four sides,
    the respective inside angles of at least three vertices (V(i) (i=1, 2, 3, . . . )) included in the perimeter segment which includes the at least four sides are equal to or less than 180 degrees,
    a distance (SS(i) (i=1, 2, 3, . . . )) between each of the at least three vertices (V(i) (i=1, 2, 3, . . . )) and a straight line (L) connecting the two vertices (A, B) is shorter than ½ of a distance between the two vertices (A, B),
    the inside angle of a vertex (C) with the smallest inside angle among the at least three vertices (V(i)) is larger than the inside angles of the two vertices (A, B), and
    vertices (VI) are present on the perimeter segment including the at least four sides, respectively between the vertex (C) with the smallest inside angle among the at least three vertices (V(i)) and one (A) of the two vertices (A, B), and between the vertex (C) with the smallest inside angle and the other (B) of the two vertices (A, B), said vertices (VI) having inside angles larger than the inside angle of the vertex (C) with the smallest inside angle.

2. A metallic hollow columnar member with a polygonal cross-section having at least five vertices and sides extending between the vertices, wherein:
    the metallic hollow columnar member comprises two joined sections (J),
    the polygonal cross-section is divided by two vertices (A, B) in the vicinity of the two joined sections (J) into two perimeter segments with a perimeter comprising one or more sides, the at least one of the two perimeter segments containing at least four sides,
    the respective inside angles of at least three vertices (V(i) (i=1, 2, 3, . . . )) included in the perimeter segment which includes the at least four sides are equal to or less than 180 degrees,
    a distance (SS(i) (i=1, 2, 3, . . . )) between each of the at least three vertices (V(i) (i=1, 2, 3, . . . )) and a straight line (L) connecting the two vertices (A, B) is shorter than ½ of a distance between the two vertices (A, B), and
    vertices (VI) are present on the perimeter segment including the at least four sides, respectively between the vertex (C) with the smallest inside angle among the at least three vertices (V(i)) and one (A) of the two vertices (A, B), and between the vertex (C) with the smallest inside angle and the other (B) of the two vertices (A, B), said vertices (VI) having inside angles larger than the inside angle of the vertex (C) with the smallest inside angle.

3. The metallic hollow columnar member according to claim 1, wherein an intended purpose of the metallic hollow columnar member is a frame of a motorcar.

4. The metallic hollow columnar member according to claim 2, wherein an intended purpose of the metallic hollow columnar member is a frame of a motorcar.

* * * * *